(12) United States Patent
Kurian et al.

(10) Patent No.: US 12,542,776 B2
(45) Date of Patent: Feb. 3, 2026

(54) VERIFYING HUMAN INTERACTION THROUGH AN ENCRYPTED CHANNEL

(71) Applicant: Bank of America Corporation, Charlotte, NC (US)

(72) Inventors: Manu Kurian, Dallas, TX (US); Ana Maxim, Arlington, VA (US); Vinesh Patel, London (GB); Michael Young, Davidson, NC (US)

(73) Assignee: Bank of America Corporation, Charlotte, NC (US)

( * ) Notice: Subject to any disclaimer, the term of this patent is extended or adjusted under 35 U.S.C. 154(b) by 209 days.

(21) Appl. No.: 18/225,200

(22) Filed: Jul. 24, 2023

(65) Prior Publication Data
US 2025/0039170 A1   Jan. 30, 2025

(51) Int. Cl.
*H04L 9/40*   (2022.01)

(52) U.S. Cl.
CPC ...... *H04L 63/0861* (2013.01); *H04L 63/0428* (2013.01)

(58) Field of Classification Search
CPC .................. H04L 63/0861; H04L 63/0428

USPC .............................................. 726/6
See application file for complete search history.

(56) References Cited

U.S. PATENT DOCUMENTS

| | | | |
|---|---|---|---|
| 8,782,425 B2* | 7/2014 | Steeves | G06F 21/10 713/184 |
| 11,675,872 B2* | 6/2023 | Holloway | H04L 47/745 726/23 |
| 11,695,771 B2* | 7/2023 | Natarajan | G06F 3/0484 726/6 |
| 12,101,317 B2* | 9/2024 | Duthoit | G06Q 20/3829 |
| 12,143,370 B1* | 11/2024 | Ou | H04L 67/1095 |
| 2012/0197688 A1* | 8/2012 | Townshend | G06Q 30/0207 705/14.1 |
| 2017/0093864 A1* | 3/2017 | Pestun | H04L 63/10 |

* cited by examiner

*Primary Examiner* — Amare F Tabor
(74) *Attorney, Agent, or Firm* — Weiss & Arons LLP

(57) ABSTRACT

Apparatus and methods to verify human interaction through an encrypted channel are provided. A human verification program may create an encrypted channel between two or more devices when a communication between users of the devices is started. Data may be transferred over the encrypted channel when a user performs a verifiably human action. The data may be analyzed to determine whether the user is more likely than not a bot. The channel may be collapsed when a pre-determined condition is satisfied.

18 Claims, 6 Drawing Sheets

VERIFYING HUMAN INTERACTION THROUGH AN ENCRYPTED CHANNEL

FIELD OF TECHNOLOGY

Aspects of the disclosure relate to providing apparatus and methods to verify human interaction through one or more encrypted channels between devices.

BACKGROUND OF THE DISCLOSURE

People often interact with each other or with various entities over a network. Entities may include individuals, corporations, partnerships, non-profits, government agencies or branches, and other groups of people. Entities may be any size, including small (one member or employee) or large (thousands of employees or members). The network may be the Internet or an internal network. Interactions may take the form of text messaging, written communications, oral communications, video communications, and other types of digital communication.

Sometimes, it may be difficult to ascertain or verify whether the person interacting is actually a person, or whether it is an AI bot pretending to be a person. As artificial intelligence capabilities grow, this question may become more prevalent and more important.

Verifying that a person is human and not an AI may be different than authenticating a person as a particular person. For example, a malicious actor may pretend to be one person, but is still a human, or a malicious AI bot may pretend to be a different person and may have the credentials to authenticate as that person but is not a human. In these situations, human verification may be required in addition to authentication of a particular person.

One current method to verify a person may be an in-person visit or a video call. However, in-person visits are impractical, and AIs can spoof videos with deepfakes and other methods.

Currently there are limited or easily spoofed apparatus and methods to verify, over a network, that a person interacting over the network is actually human as opposed to an AI.

Therefore, it would be desirable for apparatus and methods for human verification over a network.

SUMMARY OF THE DISCLOSURE

It is an object of this disclosure to provide apparatus and methods for human verification over a network through one or more encrypted channels.

A human verification computer program product is provided. The computer program product may include executable instructions. The executable instructions may be stored in non-transitory memory and be executed by a processor on a computer system.

When the executable instructions are executed by a processor on a computer system, they may create an encrypted channel between the computer system and a second device when a first user (of the computer system) and a second user (of the second device) begin a communication over a network through the computer system and the second device. The network may be an internal network or external network, such as the Internet.

The instructions may receive digital data from the second device over the encrypted channel. The data may be created by the user of the second device performing a verifiably human action. This process may be reversed as well, with the data being received from the computer system, with the data created by the user of the computer system performing a verifiably human action.

The instructions may analyze the data to verify that the second user is a human, or that the first user is a human.

The instructions may collapse the encrypted channel when a pre-determined condition is satisfied.

In an embodiment, the pre-determined condition may be when the first user or second user is determined to be human, or when both the first user and second users are determined to be human.

In an embodiment, the instructions may transmit the determination to either or both the first and second users.

In an embodiment, the verifiably human action may be responding to a captcha.

In an embodiment, the verifiably human action may be measuring a parameter with a biometric sensor.

In an embodiment, the parameter may be body temperature.

In an embodiment, the parameter may be pulse rate.

In an embodiment, the verifiably human action may be answering an arithmetic question incorrectly, on purpose. An AI may be incapable of answering a simple arithmetic question (such as, e.g., 5+6) incorrectly.

In an embodiment, the verifiably human action may be placing a particular weight on a weight sensor electronically coupled to a transmitter.

In an embodiment, the verifiably human action may be physically connecting two or more components to form an electrical circuit.

In an embodiment, the analysis may apply one or more filtering rules to determine whether the first user is a human.

In an embodiment, the verifiably human action may be typing a supplied random phrase.

In an embodiment, when the verifiably human action is typing a supplied random phrase, the analysis may analyze one or more of: typing cadence; typing speed; typing accuracy; key pressure; other factors; and a combination of any of these factors.

In an embodiment, the pre-determined condition may be either the first user or the second user ending the communication.

In an embodiment, the pre-determined condition may be an elapsed time, such as, e.g., one minute.

In an embodiment, the pre-determined condition may be when the analysis concludes that both users are more likely than not human.

In an embodiment, the pre-determined condition may be when the analysis concludes that either the first user or the second user is more likely than not a bot.

In an embodiment, the instructions may notify one user that the other user is more likely than not a bot.

In an embodiment, the network may be an internal network.

In an embodiment, the analysis may utilize one or more artificial intelligence/machine learning ("AI/ML") algorithms.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
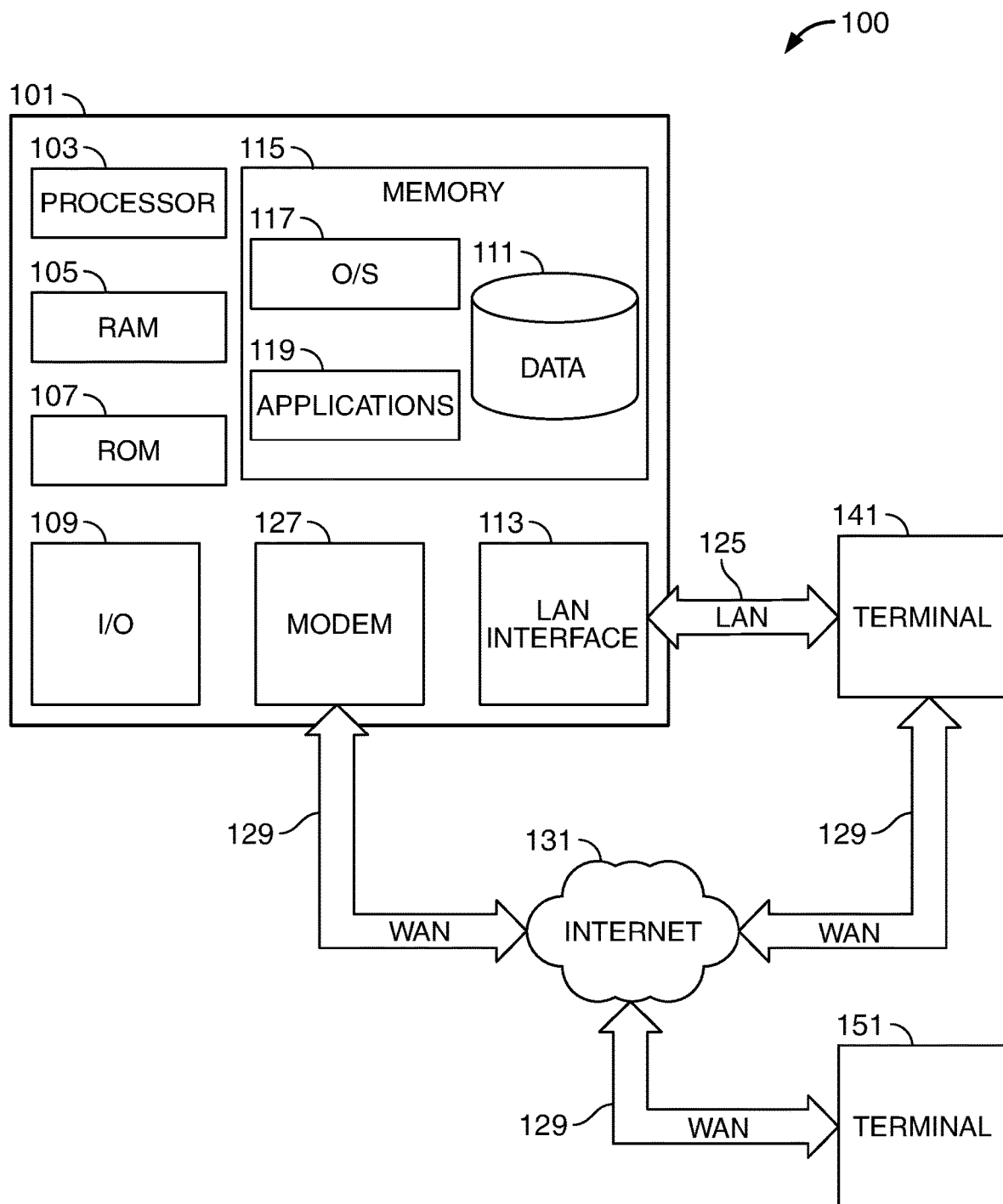
FIG. 1 shows an illustrative apparatus in accordance with principles of the disclosure.

It is an object of this disclosure to provide apparatus and methods for verifying human interaction through digital tokens.

A human verification computer program product is provided. The computer program product may include executable instructions. The executable instructions may be stored in non-transitory memory and be executed by a processor on a computer system.

Multiple processors may increase the speed and capability of the program. The executable instructions may be stored in non-transitory memory on the computer system or a remote computer system, such as a server.

Other standard components of a computer system may be present. The computer system may be a server, mobile device, or other type of computer system. A server or more powerful computer may increase the speed at which the computer program may run. Portable computing devices, such as a smartphone, laptop or tablet, may increase the portability and usability of the computer program, but may not be as secure or as powerful as a server or desktop computer.

The term "non-transitory memory," as used in this disclosure, is a limitation of the medium itself, i.e., it is a tangible medium and not a signal, as opposed to a limitation on data storage types (e.g., RAM vs. ROM). "Non-transitory memory" may include both RAM and ROM, as well as other types of memory.

The computer may include, among other components, a communication link, a processor or processors, and a non-transitory memory configured to store executable data configured to run on the processor. The executable data may include an operating system and the human verification program.

A processor or processors may control the operation of the computer system and its components, which may include RAM, ROM, an input/output module, and other memory. The microprocessor(s) may also execute all software running on the apparatus and computer system. Other components commonly used for computers, such as EEPROM or Flash memory or any other suitable components, may also be part of the apparatus and computer system.

A communication link may enable communication with other computers and any server or servers, as well as enable the encrypted channel. The communication link may include any necessary hardware (e.g., antennae) and software to control the link. Any appropriate communication link may be used, such as Wi-Fi, bluetooth, LAN, and cellular links. In an embodiment, the network used may be the Internet. In another embodiment, the network may be an internal intranet or other internal network.

The computer system may be a server. The computer program may be run on a smart mobile device. The computer program, or portions of the computer program may be linked to other computers or servers running the computer program. The server or servers may be centralized or distributed. Centralized servers may be more powerful and secure than distributed servers but may also be more expensive and less resilient.

When the executable instructions are executed by a processor on a computer system, they may create an encrypted channel between the computer system and a second device. The encrypted channel may be created when a first user and a second user begin a communication over a network through the computer system and the second device. The first user may be a user of the computer system. The second user may be a user of the second device.

The second device may be any type of computer system. The second device may be a server, personal computer, smart mobile device, or other computer. The second device may be required to have one or more human verification sensors on the second device, or electronically coupled to the second device.

The communication may be any type of digital communication that may occur over a network, such as text-based (e.g., instant messaging) communications or audiovisual communications (e.g., phone calls and video calls).

The instructions may receive data from the second device over the encrypted channel. The instructions may receive data from the computer system over the encrypted channel. The instructions may receive data from any device with an encrypted channel to another device, i.e., when there are more than two devices.

The data may be created by either the first user or the second user performing a verifiably human action.

In an embodiment, the instructions may create the channel between two or more devices, with a user for each device. For example, five users may join a single communication. One device may be chosen randomly, by an administrator, as the first device to join the communication, or through another method, to act as main user. An encrypted channel may be created between the main user's device and each of the remaining four devices, for four separate encrypted channels.

In an embodiment, the instructions may create the channel between two or more devices, with a user for each device. This embodiment may not require a central server, for any particular device to act as a central server, or for any particular device to take a lead or primary position between the devices. This embodiment may be truly decentralized. For example, five users may join a single communication. An encrypted channel may be created between every user's device and each of the remaining four devices, for ten separate encrypted channels. In this embodiment, the number of encrypted channels may be determined by the formula $(n(n-1))/2$ where n is the number of devices, as shown in the following table, Table 1:

TABLE 1

| Number of devices | Minimum number of encrypted channels between devices |
| --- | --- |
| 2 | 1 |
| 3 | 3 |
| 4 | 6 |
| 5 | 10 |
| 6 | 15 |
| ... | ... |
| n | $\frac{n(n-1)}{2}$ |

In this embodiment, the more users joining a communication, the more channels will be required and the more computing power will be required. Hardware constraints may place a limit on the number of users able to verify that other users are human or not.

In an embodiment, the instructions may receive a request from one of the users of one of the devices or computer systems to verify that one of the other users is human. For example, if the second user is communicating with the first user, but is not sure that the first user is actually a human or may be an AI bot, the second user may request that the first user be verified as a human. This disclosure presents apparatus and methods to verify that the first user is human and not a bot, through encrypted channels.

After receiving the request to verify the humanity of the first user, the instructions may request, through the encrypted channel, that the first user perform an action verifying that the user is human. The request may be provided in a digital form. The request token may be provided in the background. The request may be provided to a specific application on the first user's computer, or as a pop-up message.

In an embodiment, when a user starts communicating with another user and the encrypted channel is created, before continuing to communicate, the user may be requested or required to verify that the user is human.

The data received over the encrypted channel may be created by the user performing a verifiably human action. Performing a verifiably human action may create digital data.

The instructions may analyze the verification token to determine when the first user is human.

The instructions may analyze the data to determine when the user is a human or a bot. The analysis may factor in the type of verifiably human action taken to create the data. Some verifiably human actions may be more likely to be completed by a human than others. Some verifiably human actions may be analyzed on a "more likely to be human than not" scale. That scale may, for example, be from 0-100. The number that may be acceptable may vary from 51-100. The higher the score, the more likely the user is to be human.

In an embodiment, the acceptable number or score may be automatically varied by the computer program, or by a system administrator.

In an embodiment, the analysis may use one or more artificial intelligence/machine learning ("Ai/ML") algorithms. Any suitable AI/ML algorithm(s) may be used. Each algorithm may dynamically evaluate one or more factors in its analysis. The algorithm(s) may iterate. The algorithm(s) may be trained on a training set of data. The training set may be created data or actual data. The algorithms may be checked by one or more system administrators.

The instructions may collapse the encrypted channel when a pre-determined condition is satisfied. Collapsing the encrypted channel at some point may save communication and computer processing energy and other costs.

In an embodiment, a pre-determined condition may be when either or both users are determined to be human as opposed to bots.

In an embodiment, the verifiably human action may be responding to a captcha. Any standard captcha algorithm may be used. As AI is becoming more powerful, weaker captchas may not be able to verify that a user is a human.

In an embodiment, the verifiably human action may be measuring a parameter with a biometric sensor. For example, the user may use a fingerprint scanner, a facial ID scanner, or other biometric sensor. As AIs do not have physical bodies, an AI would not be able to take this action.

In an embodiment, the parameter may be body temperature. Some AIs may be able to spoof a fingerprint scanner or facial ID scanner with various robotics. However, it would be more difficult to spoof a full body temperature scan with a robot, as humans have a consistent and measurable body temperature gradient.

In an embodiment, the parameter may be pulse rate. Some AIs may be able to spoof a fingerprint scanner or facial ID scanner with various robotics. However, it may be more difficult to spoof a pulse rate scanner.

In an embodiment, the parameter may be any varied physical parameter that would be difficult for an AI to replicate without a human body.

In an embodiment, the verifiably human action may be answering an arithmetic question incorrectly, on purpose. An AI may be incapable of answering a simple arithmetic question (such as, e.g., 5+6) incorrectly, without instructions to do so.

In an embodiment, the program may visually present a simple arithmetic problem on a page (e.g., a webpage or application page) for the first user to answer to verify that the first user is human. The simple arithmetic problem may also include further elements (e.g., "+1" or "x0") present, but not displayed visually so that a human could see. For example, the additional element(s) may be in the same color as the background, so it would not be visible visually. However, the additional element would be visible to an AI that would read the digital data on the page, not the visual data. Doing this may ensure that the human user will always solve the problem incorrectly, while an AI would solve the problem correctly. Understanding the difference may allow the program to verify whether a user is human or not.

In an embodiment, the verifiably human action may be placing a particular weight on a weight sensor electronically coupled to a transmitter. As most AIs do not have the capability to physically move matter in the real world, placing a weight onto a weight sensor and transmitting that information to create a secondary token may be indicative that the user is more likely than not to be human.

In an embodiment, the verifiably human action may be physically connecting two or more components (e.g., wires, batteries, switches, etc.) to form an electrical circuit. As most AIs do not have the capability to physically move matter in the real world, connecting an electrical circuit and transmitting that information to create a secondary token may be indicative that the user is more likely than not to be human. In an embodiment, connecting an electrical circuit may be as simple as physically throwing a switch on an apparatus provided to the user.

In an embodiment, a verifiably human action may be a combination of two or more actions described in this disclosure, or other actions.

In an embodiment, the analysis applies one or more filtering rules to determine whether the first user is a human. These filtering rules may be static. The filtering rules may be dynamic. The filtering rules may be adjusted automatically by the program. The filtering rules may include what type of action was taken by the user to verify, as some actions may be more determinative than others. Other filtering rules may include how long it took for the user to complete the action, the location the action took place (through an IP address or GPS signal), or if two or more actions were taken by the user. Other filtering rules may be applied as well.

In an embodiment, the one or more filtering rules may be supplied by an administrator. The administrator may set each rule manually or through another program. In an embodiment, even rules supplied by an administrator may be adjusted automatically by the program, as the program learns which data is more indicative of human verification or less indicative.

In an embodiment, the instructions may be trained with a training set of data. The more data provided to the AI/ML algorithms, the more accurate the algorithms may be. The training set of data may be annotated. The training set of data may be curated.

In an embodiment, the verifiably human action may be typing a supplied random phrase. As most AIs do not have the capability to physically move matter in the real world, physically pressing keys and transmitting that information to create a secondary token may be indicative that the user is more likely than not to be human.

In an embodiment, when the verifiably human action is typing a supplied random phrase, the analysis may analyze one or more of: typing cadence; typing speed; typing accuracy; key pressure; other factors; and a combination of any of these factors. An AI that can press keys may have a unique cadence, speed, accuracy, exactly the same pressure for each key, as well as other indicators that the user is an AI. Similarly, a human will have unique typing cadence, speed, accuracy, and is more likely to press keys with different amounts of pressure.

In an embodiment, the pre-determined condition to collapse the encrypted channel may be either user ending the communication. In this embodiment, the channel may be active for the entire length of the communication.

In an embodiment, the pre-determined condition to collapse the encrypted channel may be an elapsed time for the communication, for example, five minutes. Any pre-determined elapsed time may be used. In an embodiment, the program may automatically vary the pre-determined duration of elapsed time.

In an embodiment, the pre-determined condition to collapse the encrypted channel may be when the analysis concludes that one or both users are more likely than not human. As the users have been verified, to an appropriate level, as human, there may be no more need for an encrypted channel.

In an embodiment, the pre-determined condition to collapse the encrypted channel may be when the analysis concludes that either user is more likely than not a bot. As one of the users has been determined, to an appropriate level, to not be human, there may be no need to keep the encrypted channel active. In this embodiment, the program may notify one or both of the users that the one of the users is most likely a bot. Informing the user(s) may prompt the user(s) to take corrective action or other actions.

In an embodiment, the channel may be encrypted. Encrypting the channel may be required depending on the sensitivity of the data, network, or computer systems. Any appropriate encryption protocol or method may be used.

In an embodiment, the users may communicate with each other through an internal network. Instead of communicating over a public network, such as the Internet, the users may communicate over an intranet, or internal network. Even though access to an internal network may be more tightly controlled than access over the Internet, a concern that a malicious actor may have gained access still exists. One way a malicious actor with access will behave is with an AI bot. Therefore, it may still be required to verify that a user is human when communicating over a network with that user.

In an embodiment, the number of users in a communication wherein the encrypted channel program is available may be limited in number, for example to between two and ten users. Limiting the number of users may increase the accuracy of the human verification. Limiting the number of users may increase the speed and reliability of the human verification computer program, as the numbers of encrypted channels increases with the number of users, as in Table 1.

In an embodiment, the verification or analysis data may be stored in a database. The database may be a distributed ledger. Each verification or analysis may be stored on the distributed ledger.

In an embodiment, the distributed ledger may be a blockchain.

An apparatus for human verification is provided. The apparatus may include two or more network nodes.

In an embodiment, one of the two or more network nodes may act as a central server.

The central server (or node acting as a central server) may have administrative control over the human verification program. Administrative control may include adding and removing network nodes. Administrative control may include deciding in which order to process requests. Administrative control may include offloading calculations and other processes to various nodes.

Each of the two or more network nodes may include a node communication link, a node processor, and a node non-transitory memory, among other components. Each node non-transitory memory may be configured to store at least a node operating system and a copy of the human verification application.

The human verification application may create an encrypted channel between the first network node and a second network node when a user of the first network node and a user of the second network node begin a communication over a network through the first and second network nodes.

The application may receive data from the second network node over the encrypted channel. The data may be created by the user of the second network node performing a verifiably human action.

The application may analyze the data to verify that the second user is a human or a bot.

The application may collapse the encrypted channel when a pre-determined condition is satisfied.

A method for human verification is provided. The method may include the step of creating, creating, by a human verification program on a central server, an encrypted channel between the central server, a first network node, and a second network node, when a first user of the first network node and a second user of the second network node begin a communication over a network through the first and second network nodes.

The method may include the step of receiving, at the human verification program, first data from the first network node over the encrypted channel. The first data may be created by the first user performing a verifiably human action.

The method may include the step of receiving, at the human verification program, second data from the second network node over the encrypted channel. The second data may be created by the second user performing a verifiably human action.

The method may include the step of analyzing the first data to verify that the first user is a human.

The method may include the step of analyzing the second data to verify that the second user is a human.

When the analysis concludes that the second user is a human, the method may include the step of informing the first user that the second user is more likely than not a human.

When the analysis concludes that the first user is a human, the method may include the step of informing the second user that the first user is more likely than not a human.

When the analysis concludes that the second user is not a human, the method may include the step of informing the first user that the second user is more likely than not a bot.

When the analysis concludes that the first user is not a human, the method may include the step of informing the second user that the first user is more likely than not a bot.

The method may include the step of collapsing the encrypted channel when a pre-determined condition is satisfied.

When the first user is determined to be human, the method may include the step of transmitting the determination to the second user.

In an embodiment, the human verification program may be continuously active. A user may have to continuously, or at pre-determined intervals (e.g., every minute, every fifteen minutes, etc.) verify that the user is human.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized, and that structural, functional, and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In accordance with principles of the disclosure, FIG. 1 shows an illustrative block diagram of apparatus 100 that includes a computer 101. Computer 101 may alternatively be referred to herein as a "computing device." Elements of apparatus 100, including computer 101, may be used to implement various aspects of the apparatus and methods disclosed herein. A "user" of apparatus 100 or computer 101 may include other computer systems or servers or computing devices, such as the program described herein.

Computer 101 may have one or more processors/microprocessors 103 for controlling the operation of the device and its associated components, and may include RAM 105, ROM 107, input/output module 109, and a memory 115. The microprocessors 103 may also execute all software running on the computer 101—e.g., the operating system 117 and applications 119 such as an human verification and security protocols. Other components commonly used for computers, such as EEPROM or Flash memory or any other suitable components, may also be part of the computer 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application(s) 119 (such as a human verification program and security protocols) along with any other data 111 (e.g., historical data, configuration file) needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory may be comprised of any suitable permanent storage technology—e.g., a hard drive or other non-transitory memory. The memory may store software including an operating system and any application(s) (such as a human verification program and security protocols) along with any data needed for the operation of the apparatus and to allow bot monitoring and IoT device notification. The data may also be stored in cache memory, or any other suitable memory.

An input/output ("I/O") module 109 may include connectivity to a button and a display. The input/output module may also include one or more speakers for providing audio output and a video display device, such as an LED screen and/or touchscreen, for providing textual, audio, audiovisual, and/or graphical output.

In an embodiment of the computer 101, the microprocessor 103 may execute the instructions in all or some of the operating system 117, any applications 119 in the memory 115, any other code necessary to perform the functions in this disclosure, and any other code embodied in hardware or firmware (not shown).

In an embodiment, apparatus 100 may consist of multiple computers 101, along with other devices. A computer 101 may be a mobile computing device such as a smartphone or tablet.

Apparatus 100 may be connected to other systems, computers, servers, devices, and/or the Internet 131 via a local area network (LAN) interface 113.

Apparatus 100 may operate in a networked environment supporting connections to one or more remote computers and servers, such as terminals 141 and 151, including, in general, the Internet and "cloud". References to the "cloud" in this disclosure generally refer to the Internet, which is a world-wide network. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or wi-fi).

Terminals 141 and 151 may be personal computers, smart mobile devices, smartphones, IoT devices, or servers that include many or all of the elements described above relative to apparatus 100. The network connections depicted in FIG. 1 include a local area network (LAN) 125 and a wide area network (WAN) 129 but may also include other networks. Computer 101 may include a network interface controller (not shown), which may include a modem 127 and LAN interface or adapter 113, as well as other components and adapters (not shown). When used in a LAN networking environment, computer 101 is connected to LAN 125 through a LAN interface or adapter 113. When used in a WAN networking environment, computer 101 may include a modem 127 or other means for establishing communications over WAN 129, such as Internet 131. The modem 127 and/or LAN interface 113 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The computer may transmit data to any other suitable computer system. The computer may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for a human verification program and security protocols, as well as other programs. In an embodiment, one or more programs, or aspects of a program, may use one or more AI/ML algorithm(s). The various tasks may be related to verifying that a user is a human when communicating with the user over a network.

Computer 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, server, or any other suitable device for receiving, storing, transmitting and/or displaying relevant information. Terminal 151 and/or terminal 141 may be other devices such as remote computers or servers. The terminals 151 and/or 141 may be computers where a user is interacting with an application.

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, hand-held or laptop devices, tablets, mobile phones, smart phones, other computers, and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, IoT devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
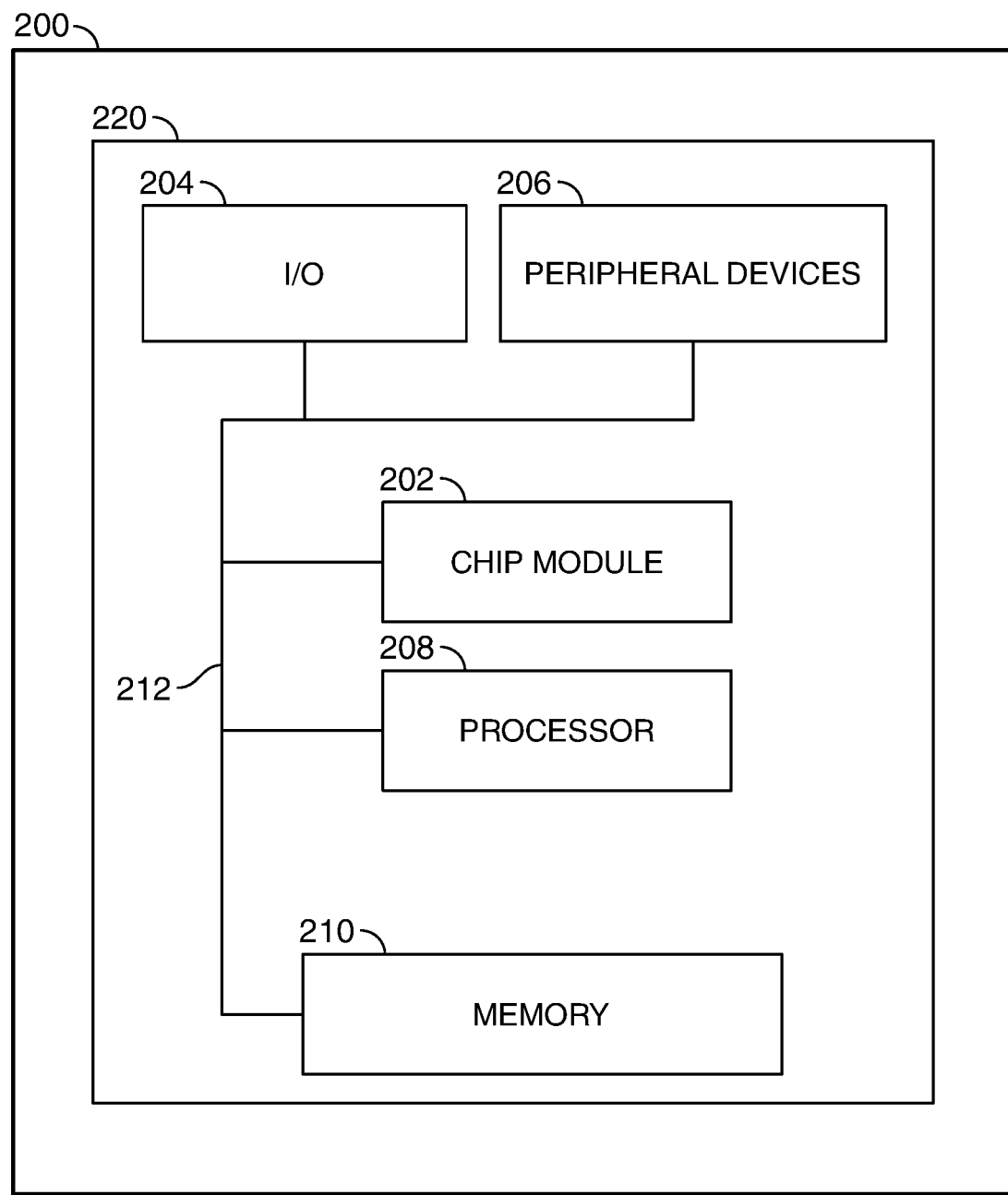
FIG. 2 shows an illustrative apparatus in accordance with principles of the disclosure.

FIG. 2 shows illustrative apparatus 200 that may be configured in accordance with the principles of the disclosure. Apparatus 200 may be a server or computer with various peripheral devices 206. Apparatus 200 may include one or more features of the apparatus shown in FIGS. 1-6. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, a display (LCD, LED, OLED, etc.), a touchscreen or any other suitable media or devices, peripheral devices 206, which may include other computers, logical processing device 208, which may compute data information and structural parameters of various applications, and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
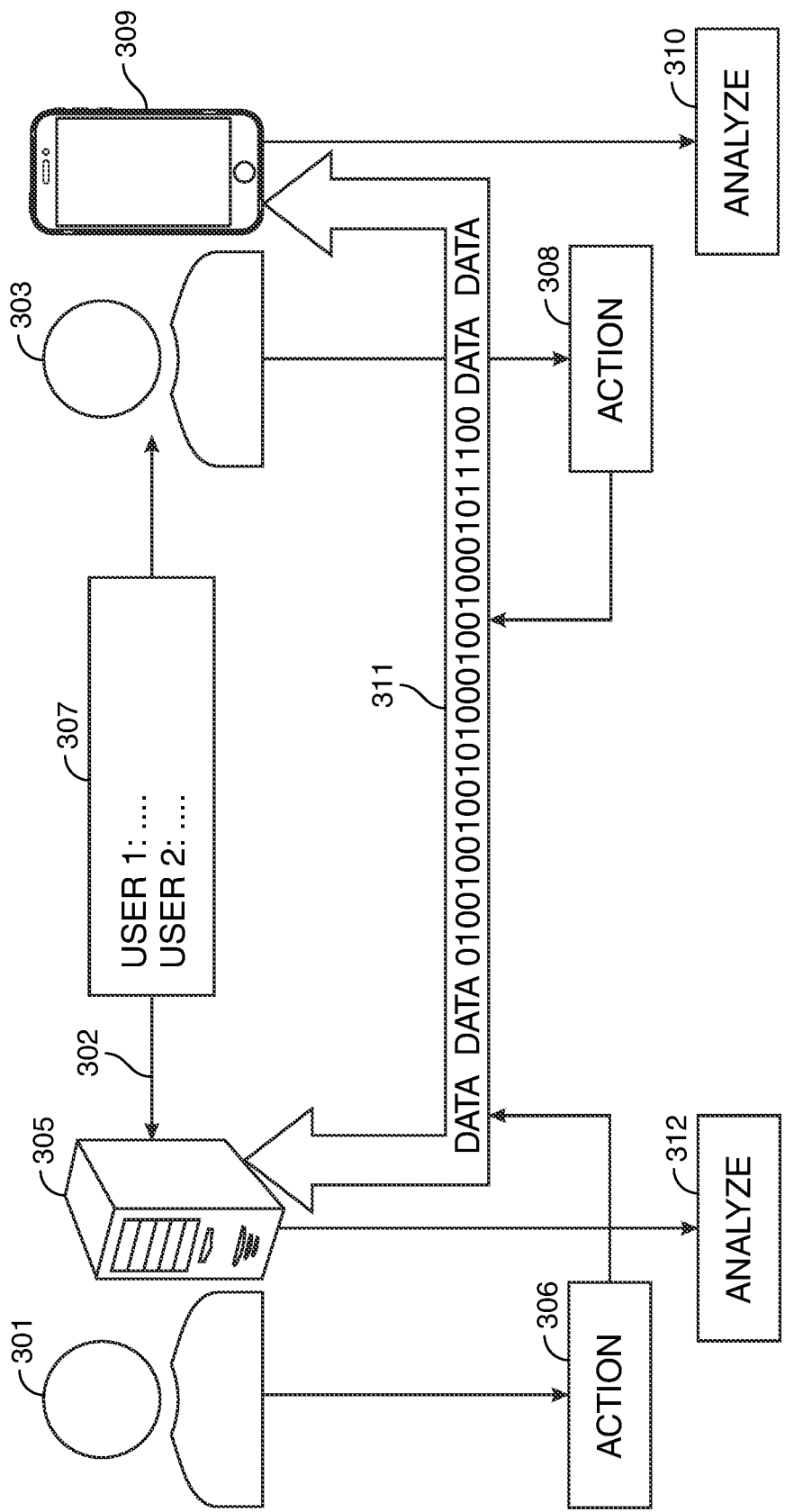
FIG. 3 shows an illustrative schematic in accordance with principles of the disclosure.
Figure 4:
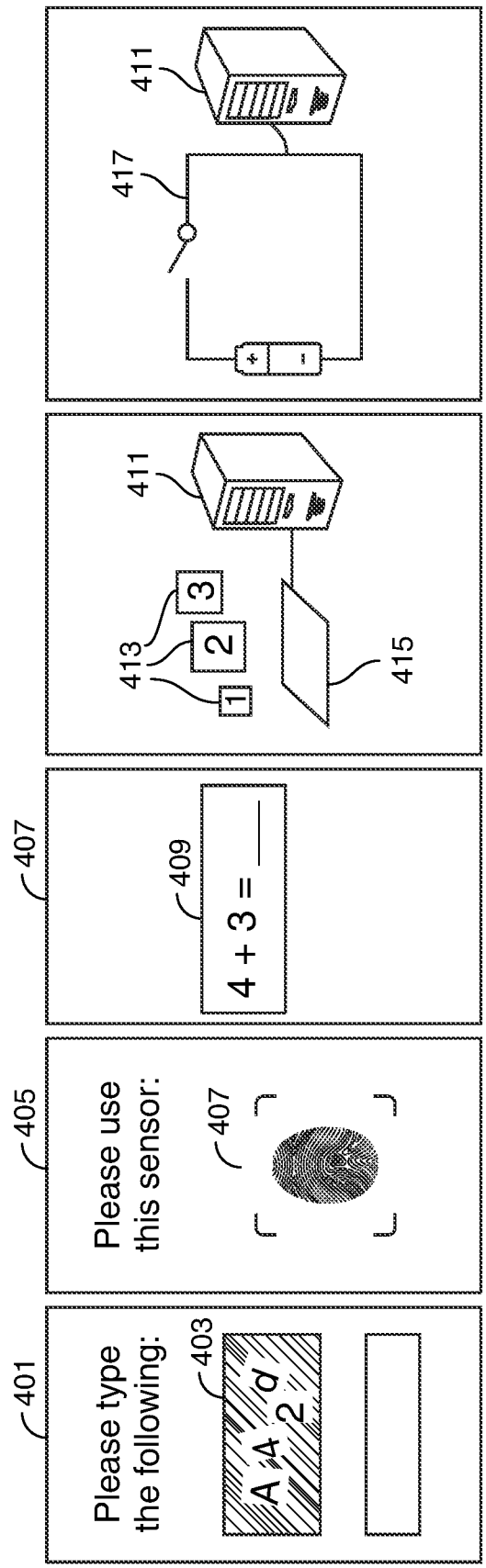
FIG. 4A shows an illustrative example of a verifiably human activity.
FIG. 4B shows an illustrative example of a verifiably human activity.
FIG. 4C shows an illustrative example of a verifiably human activity.
FIG. 4D shows an illustrative example of a verifiably human activity.
FIG. 4E shows an illustrative example of a verifiably human activity.

FIG. 3 shows an illustrative schematic in accordance with principles of the disclosure. Apparatus may include any of the components and systems odd-numbered 301 through 311, among other components, as well as steps or actions even-numbered 302 through 312 labeled on FIG. 3. Steps may be performed on the apparatus shown in FIGS. 1-4, and 6 or other apparatus shown in other figures or described elsewhere At step 302, a first user 301 using system 305 may communicate 307 with a second user 303 using second device 309. Any over-network communication protocol may be used, such as text messaging, voice messaging, video chat, email, etc.

An encrypted channel 311 may be created between system 305 and device 309 after or at the same time as the communication 307.

User 301 may perform a verifiably human action at step 306 with system 305, and the data may be shared over the encrypted channel 311.

Second device 309 may analyze the data from the first user 301 at step 310.

At step 308, the second user 303 may perform a verifiably human action with device 309. The data may be shared over encrypted channel 311.

At step 310, the second device 309 may analyze the first user 301's data received over the encrypted channel 311 to determine whether the first user 301 is a human or a bot to a pre-determined threshold level of accuracy.

At step 312, the system 305 may analyze the second user 303's data received over the encrypted channel 311 to determine whether the second user 303 is a human or a bot to a pre-determined threshold level of accuracy.

In an embodiment, if the system 305 or device 309 determines that the data from the other user (301 or 303) is not accurate enough to verify that user (301 or 303) is human, the system 305 or device 309 may request that user (301 or 303) to perform another verifiably human action at step 306 or 308 (respectively) to create additional data for the encrypted channel 311.

FIGS. 4A, 4B, 4C, 4D, and 4E show illustrative examples of verifiably human activities. These activities may be performed on the apparatus shown in FIGS. 1-6 or other apparatus shown in other figures or described elsewhere.

FIG. 4A shows computer screen 401 displaying a captcha 403.

FIG. 4B shows a biometric sensor 405, in particular a fingerprint scanner 407. Other biometric scanners to measure other biometric parameters may be used as well.

FIG. 4C shows computer screen 401 displaying an arithmetic problem 409. In an embodiment, arithmetic problem 409 may be simple. In an embodiment, arithmetic problem 409 may be complex.

In an embodiment, when a human answers the question incorrectly, that action may be verifiably human, as a bot would be expected to calculate correctly.

In an embodiment, the display 401 may only show part of the problem 409 in the visual spectrum, forcing a human user to necessarily provide an incorrect answer. However, the full problem 409 would be available to a bot which would look at the underlying data running the screen 401, where the full problem 409 would be available.

FIG. 4D shows a computer 411 connected to a weight sensor 415. A user (not shown) may be asked to place one or more of weights 413 on the weight sensor 415 to verify that the user is human. A bot would be unable to place weights on a weight sensor. The weight sensor 415 may transmit data regarding the weight 413 placed on the sensor 415 to the computer 411 to create a secondary token (not shown) as described herein.

FIG. 4E shows an electrical circuit 417 connected to a computer 411. A user (not shown) may physically move and connect parts of the electrical circuit 417 (e.g., a battery, or flipping a hardware switch) to create a complete electrical circuit. A bot would be unable to physically connect parts of the electrical circuit 417. Once the electrical circuit 417 is complete, an electrical signal may be sent to computer 411. The computer 411 may then create a secondary token (not shown) as described herein.

Figure 5:
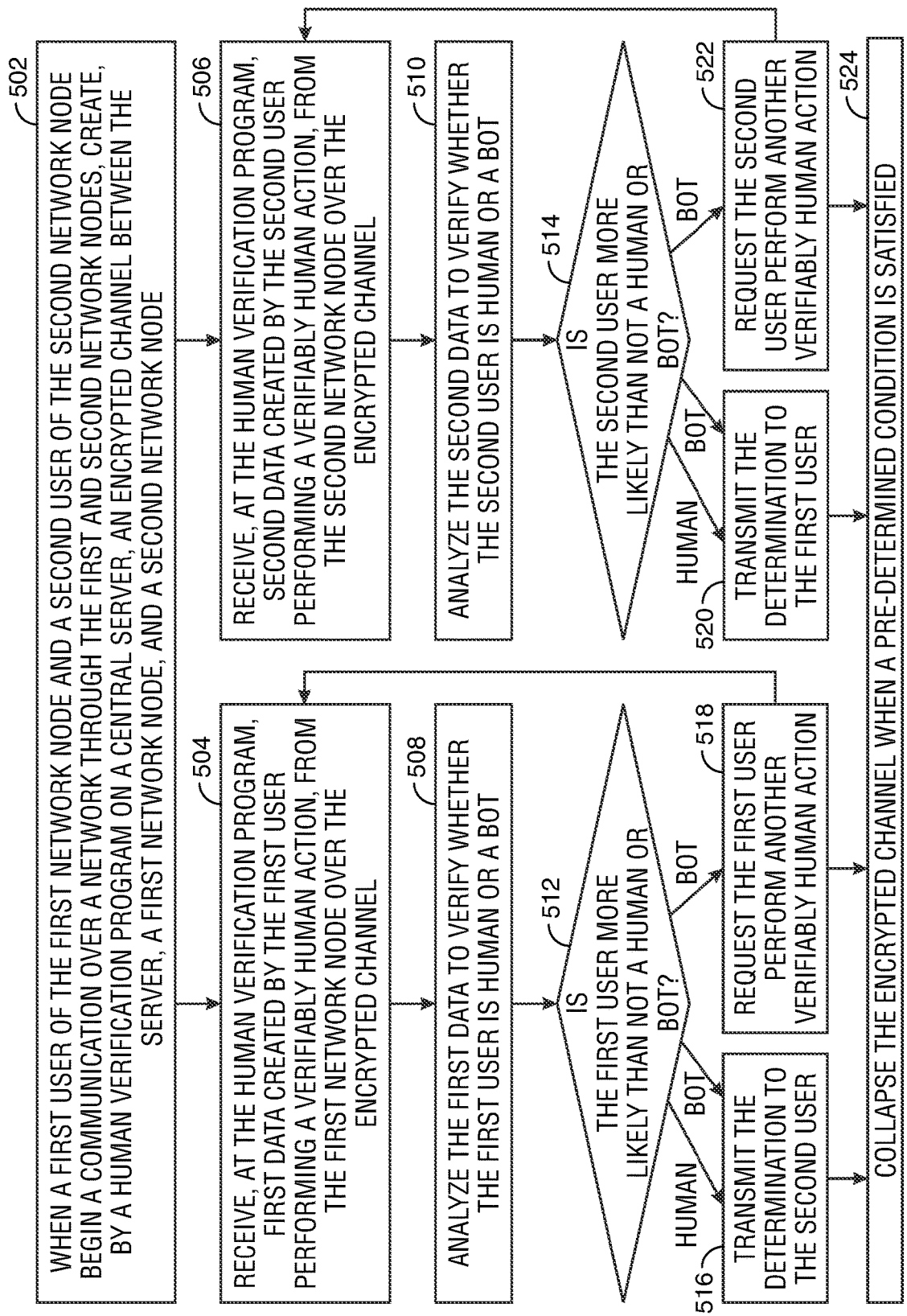
FIG. 5 shows an illustrative flowchart in accordance with principles of the disclosure.

FIG. 5 shows an illustrative flowchart in accordance with principles of the disclosure. Methods may include some or all of the method steps numbered 502 through 524. Methods may include the steps illustrated in FIG. 5 in an order different from the illustrated order. The illustrative method shown in FIG. 5 may include one or more steps performed in other figures or described herein. Steps 502 through 524 may be performed on the apparatus shown in FIGS. 1-4, 6 or other apparatus.

At step 502, when a first user of a first network node and a second user of a second network node begin a communication over a network through the first and second network nodes, a human verification program on a central server, may create an encrypted channel between the server, a first network node, and a second network node.

In an embodiment, one of the two (or more) network nodes may act as the central server. In this embodiment, the encrypted channel may be between the first network node and second network node, with a human verification application on one or both network nodes.

At step 504, the human verification may receive first data created by the first user performing a verifiably human action, from the first network node over the encrypted channel.

All data received and analysis performed by the program may be securely stored in a database. The database may be on the central server. The database may be distributed across multiple computers. The database may be a distributed ledger. The distributed ledger may be a blockchain.

At step 506, the human verification program may receive second data created by the second user performing a verifiably human action, from the second network node over the encrypted channel.

At step 508, the human verification program may analyze the first data to verify whether the first user is a human or a bot. It may analyze, in an embodiment, by applying one or more artificial intelligence/machine learning ("AI/ML") algorithms, to the first data. It may analyze to determine whether the first data meets a pre-determined threshold level of accuracy and verification In an embodiment, the human verification program may be able to handle multiple encrypted channels between multiple users at the same time.

At step 510, the human verification program may analyze the second data to verify whether the second user is a human or a bot. It may analyze, in an embodiment, by applying one or more artificial intelligence/machine learning ("AI/ML") algorithms, to the second data. It may analyze to determine whether the second data meets a pre-determined threshold level of accuracy and verification At step 512, in response to the analysis at step 508, the program may ask whether the first user is more likely than not a human or a bot.

At step 514, in response to the analysis at step 510, the program may ask whether the second user is more likely than not a human or a bot.

At step 516, the program may transmit the determination of whether the first user is more likely than not a bot or a human to the second user.

At step 518, if the program determines that the first user is more likely than not a bot, the program may request the first user perform another verifiably human action, and then repeat steps 504, 508, 512.

At step 520, the program may transmit the determination from step 514 of whether the second user is more likely than not an AI bot or a human to the first user.

At step 522, if the program determines that the second user is more likely than not a bot, the program may request the second user perform another verifiably human action, and then repeat steps 506, 510, 514.

At step 524, the program may collapse the encrypted channel when a pre-determined condition is satisfied.

Figure 6:
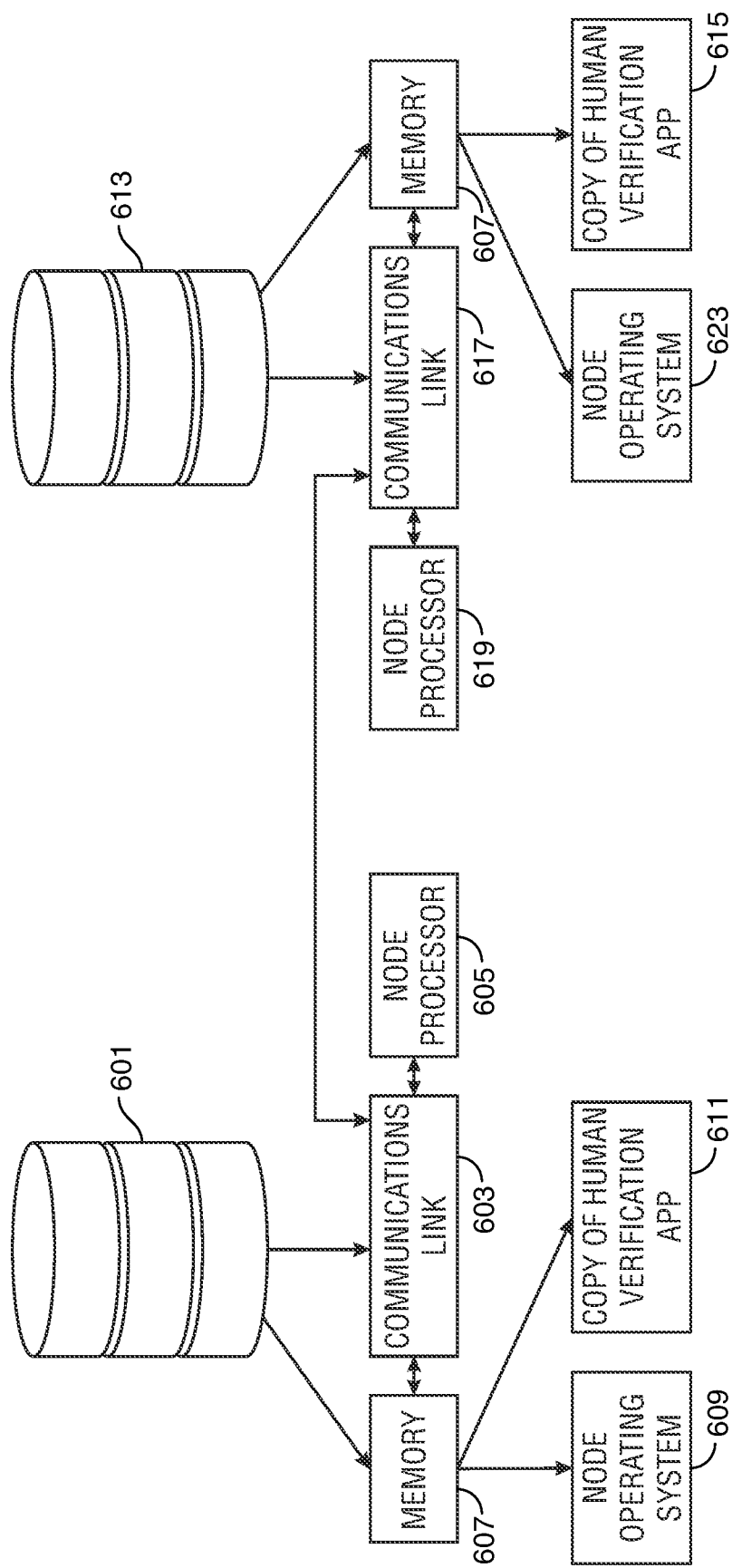
FIG. 6 shows an illustrative apparatus in accordance with principles of the disclosure.

FIG. 6 shows an illustrative apparatus in accordance with principles of the disclosure. The apparatus may include a two or more network nodes, a first network node 601 and a second network node 613.

Any network node may act as a central server.

The first network node 601 may include a communications link 603, a processor/processors 605, and a non-transitory memory 607, as well as other components.

The second network node 613 may include a communications link 617, a processor or processors 619, and a non-transitory memory 621.

Each node may be a computer, smart mobile device, server, or other computing device, with one or more human verification sensors electronically coupled to the node.

The first node non-transitory memory 607 may include a node operating system 609, a copy of a human verification application 611, as well as other data and programs.

The communications link 603 may communicate with other nodes, such as node 613 (as well as other servers/computers, not shown) through communications link 617. The first node copy of human verification program 611 may communicate with all other nodes 613 through the first node's communications link 603.

The second node's non-transitory memory 621 may include a node operating system 623, and a copy of the human verification program 615.

The human verification program 611 or 615 may create an encrypted channel between the first network node 601 and the second network node 613 when a user (not shown) of the first network node 601 and a user (not shown) of the second network node 613 begin a communication over a network through the first and second network nodes 601 and 613.

The human verification program 611 or 615 may receive data from the other network node over the encrypted channel. The data may be created by the respective user of whichever network node performing a verifiably human action.

The human verification program 611 or 615 may analyze the respective data to verify that the respective user is more likely than not a human or whether the respective user is more likely than not a bot.

The human verification program 611 or 615 may collapse the encrypted channel when a pre-determined condition is satisfied.

Thus, apparatus and methods to verify that a user is human, and not a bot through using encrypted channel(s) are provided. Persons skilled in the art will appreciate that the present invention can be practiced by other than the described embodiments, which are presented for purposes of illustration rather than of limitation.

What is claimed is:

1. A human verification computer program product, the computer program product comprising executable instructions, the executable instructions when executed by a processor on a computer system:
    create an encrypted channel between the computer system and a second device when a first user and a second user begin a communication over a network through the computer system and the second device;
    receive data from the second device over the encrypted channel;
    analyze the data to verify that the second user is a human; and
    collapse the encrypted channel when a pre-determined condition is satisfied;
wherein:
    the data is created by the user of the second device performing at least one verifiably human action; and
    wherein the verifiably human action comprises answering an arithmetic question incorrectly and placing a particular weight on a weight sensor electronically coupled to a transmitter;
    the first user uses the computer system; and
    the second user uses the second device.

2. The human verification computer program product of claim 1 wherein the verifiably human action further comprises responding to a captcha.

3. The human verification computer program product of claim 1 wherein the verifiably human action further comprises measuring a parameter with a biometric sensor.

4. The human verification computer program product of claim 3 wherein the parameter is body temperature.

5. The human verification computer program product of claim 3 wherein the parameter is pulse rate.

6. The human verification computer program product of claim 1 wherein the verifiably human action further comprises physically connecting two or more components to form an electrical circuit.

7. The human verification computer program product of claim 1 wherein the analysis applies one or more filtering rules to determine whether the user is a human.

8. The human verification computer program product of claim 1 wherein the verifiably human action further comprises typing a supplied random phrase.

9. The human verification computer program product of claim 8 wherein the analysis analyzes one or more of:
    a) typing cadence;
    b) typing speed;
    c) typing accuracy;
    d) key pressure; and
    e) a combination of a)-d).

10. The human verification computer program product of claim 1 wherein the pre-determined condition is either the first user or the second user ending the communication.

11. The human verification computer program product of claim 1 wherein the pre-determined condition is an elapsed time.

12. The human verification computer program product of claim 1 wherein the pre-determined condition is when the analysis concludes that both users are more likely than not human.

13. The human verification computer program product of claim 1 wherein the pre-determined condition is when the analysis concludes that either the first user or the second user is more likely than not a bot.

14. The human verification computer program product of claim 13 wherein the instructions further notify one user that the other user is more likely than not a bot.

15. The human verification computer program product of claim 1 wherein the network is an internal network.

16. The human verification computer program product of claim 1 wherein the analysis utilizes one or more artificial intelligence/machine learning ("AI/ML") algorithms.

17. An apparatus for human verification, the apparatus comprising:
two or more network nodes, each network node comprising:
a node communication link;
a node processor; and
a node non-transitory memory configured to store at least:
a node operating system; and
a human verification application;
wherein the human verification application on a first network node:
creates an encrypted channel between the first network node and a second network node when a user of the first network node and a user of the second network node begin a communication over a network through the first and second network nodes;
receives data from the second network node over the encrypted channel, wherein the data is created by the user of the second network node performing a verifiably human action; and
wherein the verifiably human action comprises physically connecting two or more components to form an electrical circuit and placing a particular weight on a weight sensor electronically coupled to a transmitter;
analyzes the data to verify that the second user is a human; and
collapses the encrypted channel when a pre-determined condition is satisfied.

18. A method for human verification, the method comprising the steps of:
creating, by a human verification program on a central server, an encrypted channel between:
the central server;
a first network node; and
a second network node
when a first user of the first network node and a second user of the second network node begin a communication over a network through the first and second network nodes;
receiving, at the human verification program, first data from the first network node over the encrypted channel, wherein the data is created by the first user performing a verifiably human action; and
wherein the verifiably human action comprises typing a supplied random phrase and placing a particular weight on a weight sensor electronically coupled to a transmitter;
receiving, at the human verification program, second data from the second network node over the encrypted channel, wherein the data is created by the second user performing a verifiably human action;
analyzing the first data to verify that the first user is a human, wherein the analysis analyzes one or more of:
a) typing cadence;
b) typing speed;
c) typing accuracy;
d) key pressure; and
e) a combination of a)-d);
analyzing the second data to verify that the second user is a human;
informing the first user when the second user is more likely than not a bot;
informing the second user when the first user is more likely than not a bot; and
collapsing the encrypted channel when a pre-determined condition is satisfied.

\* \* \* \* \*